E. H. BENEDICK.
LOCK FOR SPARE RIMS AND TIRES.
APPLICATION FILED AUG. 18, 1921.
1,402,472.
Patented Jan. 3, 1922.
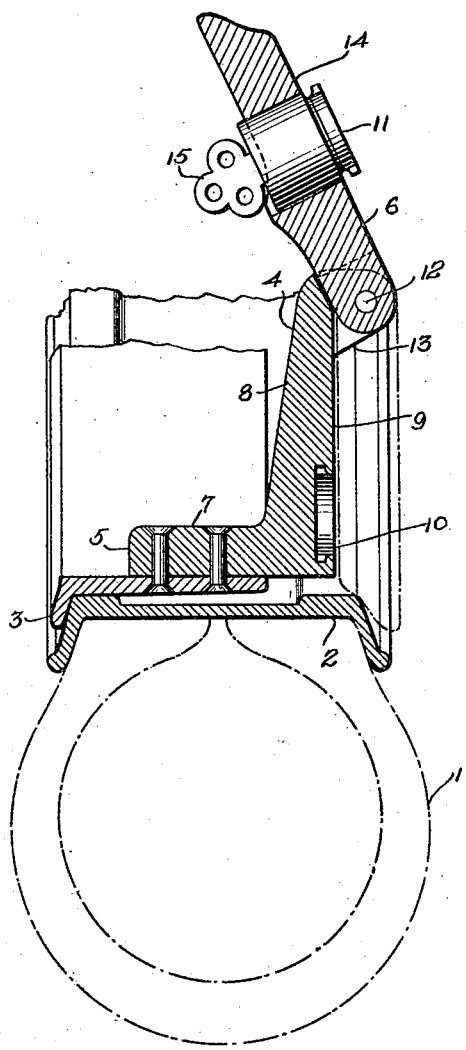
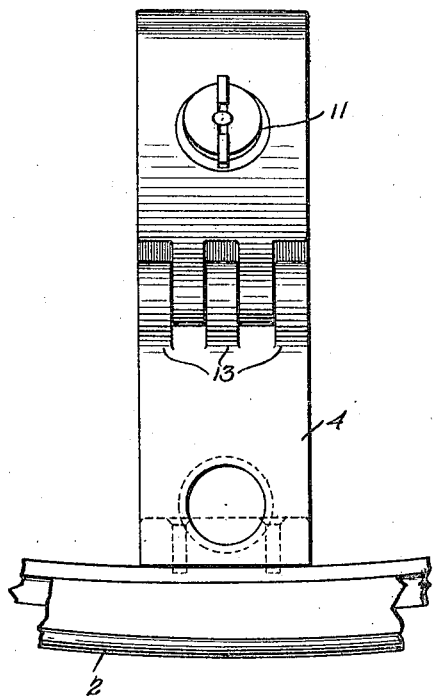
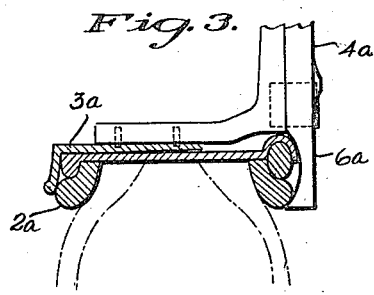
WITNESSES
E. A. Wilson
Albert J. Clark
INVENTOR
EARNEST H. BENEDICK
BY Munn & Co
ATTORNEYS

UNITED STATES PATENT OFFICE.

EARNEST H. BENEDICK, OF HUNTINGTON, WEST VIRGINIA, ASSIGNOR OF ONE-THIRD TO IRA J. McGINNIS AND ONE-THIRD TO ERNEST E. KINCADE, BOTH OF HUNTINGTON, WEST VIRGINIA.

LOCK FOR SPARE RIMS AND TIRES.

1,402,472.  Specification of Letters Patent.  Patented Jan. 3, 1922.

Application filed August 18, 1921. Serial No. 493,195.

*To all whom it may concern:*

Be it known that I, EARNEST H. BENEDICK, a citizen of the United States, residing at Huntington, in the county of Cabell and State of West Virginia, have invented certain new and useful Improvements in Locks for Spare Rims and Tires, of which the following is a full, clear, and exact description.

This invention relates to a device for locking a spare rim and tire to the bracket or carrier positioned at the side or rear of a vehicle for carrying such spare parts and more particularly for an improved lock therefor adapted to prevent a straight side rim or a clincher rim upon which is mounted a tire casing from being lost from the bracket or from being removed by an unauthorized person.

An object of my invention is to provide an improved lock for securing the spare rim, upon which is mounted a tire casing, to the bracket or carrier having the lock positioned in the hasp, removed from the hasp hinge and close to the rim, thereby holding the hasp more secure against movement.

Another object of my invention is to provide a lock of this character which has the lock positioned so that it is readily accessible and convenient to operate and presents a pleasing appearance when applied to the vehicle.

Another object of my invention is to provide a lock of this type with the hasp depending, whereby its natural tendency due to its weight is to remain in locked position with the base. In locks of this type, heretofore, the hasp has been hinged to the base with a pivotal and slidable movement. In order to secure the hasp against movement with relation to the base, the hasp in the present invention is hinged to the base with a pivotal movement only.

Another object of my invention is to produce an improved lock of this character which is durable, simple in construction and can be placed on the market at a small cost.

With these and other objects in view, the invention consists in the novel construction and arrangement of parts, as will be explained more fully hereinafter.

In the drawings, illustrating my invention, similar characters of reference designate corresponding parts, in which Figure 1 is a vertical sectional view through the lock, carrier and spare rim, showing the tire casing in dotted outline and the hasp thrown out of locked position with the base.

Figure 2 is a side view of the device as shown in Figure 1.

Figure 3 is a modification of the improved lock as applied to a clincher rim with the rim shown in vertical section.

Referring to the drawing, illustrating my invention, I have shown in Figure 1 a pneumatic tire casing 1 mounted upon a spare rim 2, the rim being mounted upon an annular bracket or carrier 3 secured to the vehicle at the side or rear. The spare rim or tire lock designated generally by 4, is composed of the L-shaped base plate or bracket 5 and the hasp or lever 6. The L-shaped base plate 5 has a horizontal portion 7 and a vertical portion 8, the horizontal portion 7 being secured to the bracket or carrier 3 in any convenient manner, and as shown, is riveted, the heads of the rivets being countersunk. The vertical portion 8 has a smooth outer surface 9 and a cylindrical bore 10 to accommodate the barrel lock 11 positioned in the lever 6.

At the upper end of the vertical portion 8 the hasp or lever 6 is pivotally hinged to the outward extending bosses or lugs 13 on the pivot pin 12. The hasp 6 has a smooth surface 14 to co-operate with the smooth surface 9 of the vertical portion 8, forming a snug fit with the base 5 when in locked engagement therewith.

Removed as far as possible from the hinge is the lock 11, which as shown is a barrel lock but which can be of any preferred type. The barrel lock 11 is adapted to lock the hasp or lever in operative position to the angle base plate 5. The hasp 6 depending, as shown in dotted line in Figure 1, abuts against the side of the spare rim, thereby securing the rim from outward movement from its position on the carrier when the hasp is in locked engagement with the base 5. My invention is applicable to all types of rims and a slight modification can be made in the hasp or lever to conform to the particular rim used without departing from the spirit of my invention.

In Figure 3 the lock 4A, shown on a reduced scale, is adapted to secure the clincher rim 2A to the carrier 3A, the hasp 6A being shaped to conform to this type of rim.

It is the usual practice before mounting the tire and rim upon the bracket to inflate the tire. When this is done the lock is then positioned preferably directly opposite the inflating valve so as to co-operate with the same for preventing the removal of the spare rim and tire from the bracket. When in position, the hasp is rotated into locked position with the base and the key 15 turned, thereby effectually locking the spare rim and tire upon the bracket.

Having thus described my invention, I claim—

1. In a device of the character described, in combination, an angle base plate or bracket comprising a horizontal member adapted to be rigidly secured to a rim carrier, and a vertical member, a hasp arm or lever pivotally hinged at one end to the outer end of the vertical member, and a key operated lock carried by said arm to lock the hasp arm to the aforesaid vertical member of the base plate or bracket.

2. In a device of the character described, the combination with a vertical bracket adapted to be rigidly secured to an annular carrier, and project rigidly therefrom, a hasp arm or lever hinged at one end to the outer end of said bracket, the free end of the arm extending beyond the plane of the rim carrier and adapted to engage and hold in place a rim or tire upon said carrier, and a key operated lock carried by said arm intermediate its ends to engage and lock the abutting faces of the arm and brackets in locked relation.

3. In a device of the character described, in combination, an L-shaped base plate adapted to be rigidly secured to a rim carrier, a hasp hinged to said base plate, said hasp depending vertically from said base plate when in locked position, the free end of said hasp constituting a rim engaging end, and means for locking the hasp and base plate together.

4. In a device of the character described, an L-shaped base plate comprising a horizontal portion adapted to be secured to an annular rim carrier, and a vertical portion, said vertical portion having a smooth outer surface and an opening therein, a hasp arm pivotally hinged to said vertical portion at its outer end, said hasp arm having a smooth surface to fit snugly against the outer surface of the base plate and a rim engaging end, and a lock carried by said arm, said lock adapted to cooperate with the opening in the vertical portion of the bracket for locking the hasp arm to said base plate.

5. In a device of the character described, the combination with an annular rim carrier, of a bracket secured thereon and extending radially therefrom, a hasp lever pivotally secured at one end to the outer end of said bracket and adapted to swing outwardly therefrom, and a key operated lock carried by said lever adapted to engage said bracket to positively lock the hasp lever thereto, said lever having a rim engaging end, all substantially as herein set forth.

6. Locking means for spare rims and tires, comprising a bracket adapted to be rigidly mounted on a spare rim carrier, said bracket having its front face in a plane and a forwardly offset pintle at its free end, a hasp arm hingedly secured at one end to said pintle and its free end extending well beyond the plane of attachment of the bracket to the carrier to constitute a rim engaging end, and a key lock carried by said hasp arm intermediate its ends and adapted to engage the plane face of the bracket and lock the arm hereagainst.

EARNEST H. BENEDICK.